Oct. 6, 1953

A. VAN DUYN 2,654,596

CONTROL DEVICE FOR THE RECORDING
MECHANISM OF WEIGHING APPARATUS

Filed Aug. 2, 1947

Inventor
Adrianus Van Duyn
By Spencer, Marzall, Johnston & Cook
Attys.

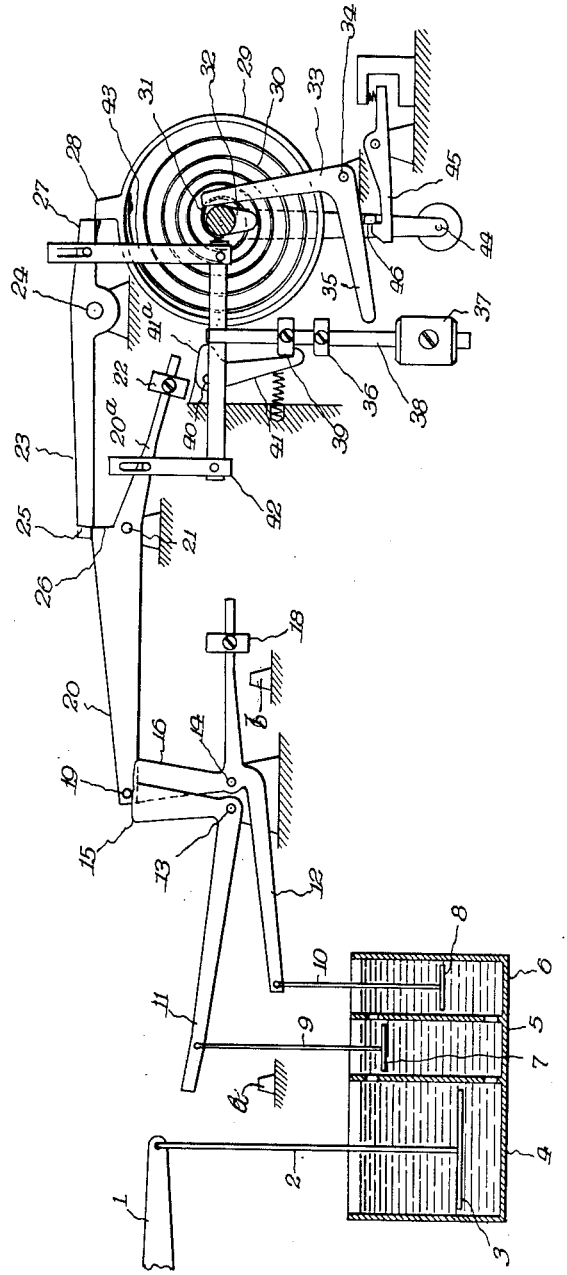

Oct. 6, 1953            A. VAN DUYN         2,654,596
CONTROL DEVICE FOR THE RECORDING
MECHANISM OF WEIGHING APPARATUS
Filed Aug. 2, 1947                              3 Sheets-Sheet 3
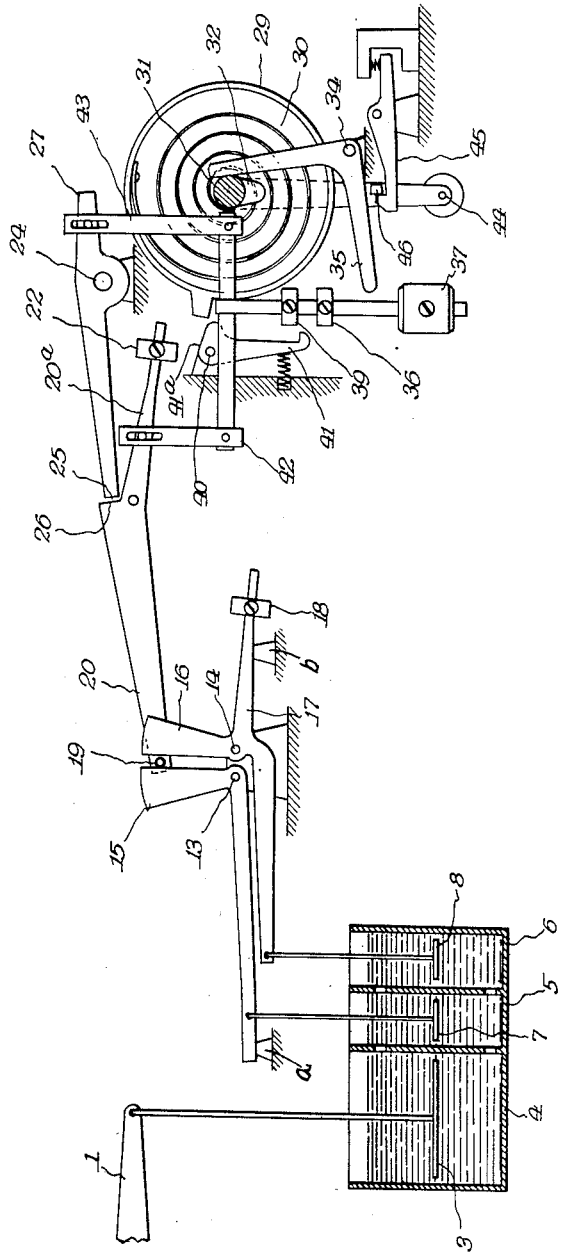
Inventor
Adrianus Van Duyn
By: Spencer, Marzall, Johnston + Cook
Attys Patented Oct. 6, 1953

2,654,596

UNITED STATES PATENT OFFICE 2,654,596

CONTROL DEVICE FOR THE RECORDING MECHANISM OF WEIGHING APPARATUS

Adrianus van Duyn, Hillegersberg, Rotterdam, Netherlands, assignor to U. S. Slicing Machine Company, Inc., a corporation of Indiana Application August 2, 1947, Serial No. 765,668
In the Netherlands September 24, 1941

Section 1, Public Law 690, August 8, 1946
Patent expires September 24, 1961

10 Claims. (Cl. 265—5)

This invention relates to a control device for the recording mechanism of weighing apparatus.

An object of the invention is to provide a simple and robust mechanical control device whereby operation of the recording mechanism is positively prevented during weighing movement of the weighing apparatus, and is automatically effected when the weighing apparatus attains equilibrium.

According to the invention, there is provided a control device for the recording mechanism of weighing apparatus, said device including driving means for the recording mechanism, operation of the driving means being prevented during weighing movement of the weighing apparatus, and being effected when the weighing apparatus attains equilibrium, characterized in that the driving means preferably comprises a spring motor adapted for manual winding prior to each weighing operation.

Further according to the invention, there is provided a control device for the recording mechanism of weighing apparatus, said device comprising a spring motor adapted to drive the recording mechanism, trigger mechanism adapted to prevent driving action of the motor's wound spring during weighing movement of the weighing apparatus, and release means for the trigger mechanism, said means being operable by the weighing apparatus, so that when the weighing apparatus attains equilibrium, the trigger mechanism is released and the motor operates to drive the recording mechanism.

An embodiment of the invention will now be described by way of example with reference to the accompanying drawings, in which:

Fig. 2 is a side view when the weighing apparatus is between its zero and equilibrium positions, the motor spring being fully wound.

Fig. 3 is a side view of the device when the weighing apparatus is in its equilibrium position, the motor spring being partly unwound.

Figure 1:
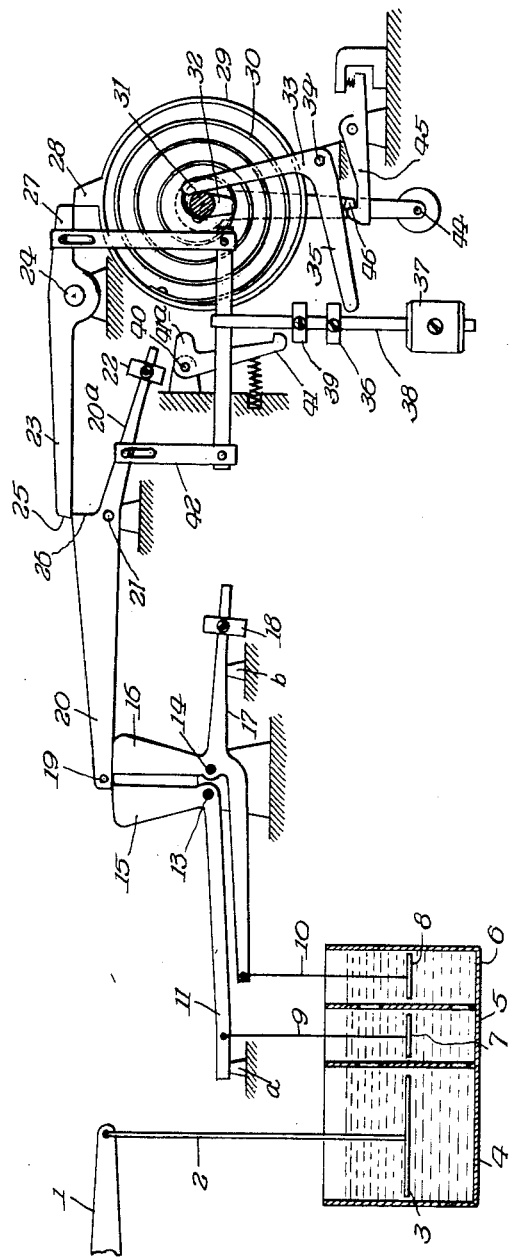
Fig. 1 is a side view of the control device when the weighing apparatus is at zero position and the motor spring is unwound.

The recording mechanism (not shown) is adapted to give a printed record of the weight of the commodity applied to the weighing apparatus, and is operated by a spring motor consisting of a rotary drum 29, a rotary spindle 31 about which the drum rotates, and a spiral spring 30 located within the drum and having one end fixed to the drum, and the other end fixed to the spindle. Rotation of the drum 29 under the action of the spring 30 effects recording movement to the printing mechanism. Prior to each weighing operation, the spring is manually wound by a crank handle 44 which is secured to the spindle 31, and is locked against unwinding by a spring-urged pawl 45 which co-operates with a catch 46 on the handle.

Trigger mechanism adapted to prevent rotary driving movement of the drum 29 during weighing movement of the weighing apparatus, consists of a double-armed trigger lever 23 pivotally mounted at 24, and a double-armed support lever 20 pivotally mounted at 21 and provided with a poise 22 at the end of its arm 20a. The levers 20 and 23 both tend to pivot in anti-clockwise direction. With the trigger mechanism pre-set (Fig. 1), the end 27 of tht trigger 23 engages the tip of an abutment 28 on the drum 29, to prevent rotation of the drum, and the end 25 of the trigger extends over the edge of a stepped portion 26 of the lever 20.

Release of the trigger mechanism is effected by causing slight clockwise pivoting movement of the lever 20, and thereafter releasing the lever to allow anti-clockwise movement thereof, under its own weight, until the edge of the stepped portion of the lever is clear of the trigger 23, which thereupon pivots in anti-clockwise direction (Fig. 3) clear of the abutment 28, to permit driving movement of the drum 29.

The trigger mechanism is released by release means operable by the weighing apparatus, and comprising a pair of cranked levers 11, 12 pivotally mounted at opposed points 13 and 14, and connected by rods 9 and 10 to pistons 7 and 8 movable in side-by-side dashpot cylinders 5 and 6 secured to each other. A relatively large dashpot cylinder 4 secured to the cylinder 5 has therein a piston 3 connected to the weigh beam 1 of the weighing apparatus by a rod 2. The dashpot cylinders 4, 5 and 6 are filled with damping fluid, for example oil, and communicate with each other through openings above and also below the pistons 3, 7 and 8. When the weigh beam is stationary, the pistons 7 and 8 will be at the same level (Figs. 1 and 3). Also, with the weigh beam stationary, sector-shaped arms 15 and 16 of the levers 11 and 12, respectively, are spaced from each other (Figs. 1 and 3) to define a vertical slot, a pin 19 at the end of the lever 20 being adapted to pass down the vertical slot, or between the arms 15 and 16, which movement serves to release the trigger mechanism (Fig. 3).

An extension 17 on the lever 12 carries a counterweight 18.

In Fig. 1 the levers 11 and 17 are situated upon the abutments *a* and *b*, respectively.

Loading of the weighing apparatus causes a downward movement of the piston 3. This downward movement of the piston 3 has the effect of raising piston 7 such that this moves the lever arm 15 to a position for closing the slot between the lever arms 15 and 16 and engaging the pin 19. However, the piston 8 is still locked at that moment, whereby the lever arm 17 bears on its abutment *b*. Therefore, the piston 8 must stand in its resting position when the piston 7 has been moved upward.

By unloading of the weighing apparatus, it is clear that the piston 3 moves upward and the piston 7 downward by the suction of the fluid at the bottom under the piston and by the pressure of the fluid above the piston. Of course, the piston 8 also moves downward by the suction force of the fluid caused by the large piston 3, whereby this piston and its lever arms 12 and 16 takes over the task of the arm 11, 15 of the piston 7, so that only the arm 16 engages the pin 19, instead of the arm 15, which is moved back to the position shown in Fig. 1.

When the weighing mechanism has come to its zero position again, the levers 12 and 17 are going back to their original position by their own weights, as Fig. 1 shows, whereby the slot between the arms 15 and 16 is open for passage of the pin 19, which releases the trigger mechanism and permits operation of the motor and driving of the printing mechanism.

Resetting means for the trigger mechanism consists of a substantially U-shaped member having U arms 42 and 43, with slots at their upper ends engaged by pins on the lever 20 and on the trigger 23, respectively. A downwardly extending arm 38 on the U member is weighted at 37, and has fixed thereto an adjustable abutment 39 adapted to be engaged by a pivotal hook 41, which is spring-urged to maintain the U member in upper (or inoperative) position, in which position the pins are at the bottom of the slots, thereby allowing pivotal movement of the lever 20 and trigger 23 (Figs. 2 and 3). The hook 41 has a cam portion 41*a* which, on anti-clockwise rotation of the drum 29, is engaged by the abutment 28, so that the hook is pivoted out of engagement with the abutment 39 and the loaded U member falls to a lower (or operative) position, the upper ends of the slots engaging the pins and resetting the trigger mechanism. The drum 29 continues to rotate until the abutment 28 strikes the end 27 of the re-set trigger 23, the printing operation being completed and the spring wound down in one complete revolution of the drum.

Return of the re-setting means to inoperative position is effected by mechanism consisting of a cam 32 on the spindle 31, and a bell crank lever pivotally mounted at 34, with one arm 33 engaging the cam 32, and the other arm 35 engageable with a collar 36 on the arm 38. On turning the handle 44 anticlockwise to re-wind the spring for the next weighing operation, the pressure of the abutment 28 on the trigger 23 is sufficient to maintain the trigger mechanism in re-set position (Fig. 1), and on continued turning of the handle, the cam 32 rocks the bell crank lever to cause the arm 35 to engage the collar 36 to raise the arm 38, which raises the re-setting means to out-of-phase position. With the spring fully wound, the recording mechanism is then ready for the next weighing operation.

While the preferred form of the invention is herein shown and described, it is to be understood that various changes may be made in the details of construction, and in the combination and arrangement of the several parts, within the scope of the claims, without departing from the spirit of this invention.

What is claimed as new is:

1. A control device for the recording mechanism of a weighing apparatus, said device embodying a spring motor having a rotary drum to drive the recording mechanism, a rotary spindle extending within the drum and adapted for rotation relatively to the drum, a spiral spring within the drum and having one end fixed to the drum and the other end fixed to the spindle, an abutment on the drum, means adapted to engage said abutment during weighing movement of the weighing apparatus, to maintain the drum against driving movement, means controlled in its movement by the operation of the weighing apparatus, for releasing said drum when the weighing apparatus attains equilibrium, to permit the drum to drive the said recording mechanism, the last said means embodying a trip lever, and dash pot mechanism for controlling the operation of the trip lever.

2. A control device for recording mechanism of weighing apparatus, said device including driving means for the recording mechanism, a trigger for maintaining the driving means against operation, a lever for locking the trigger in operative position, locking means for retaining the said lever in a position to lock the trigger in its operative position, and means embodying dash pot mechanism, the action of which is responsive to the operation of the weighing mechanism, for rendering the last said means active when the weighing apparatus attains equilibrium.

3. A control device for recording mechanism of weighing apparatus, said device including driving means for the recording mechanism, a trigger for maintaining the driving means against operation, a lever for locking the trigger in operative position, locking means for retaining the said lever in a position to lock the trigger in its operative position, means responsive to the operation of the weighing mechanism for rendering the last said means active when the weighing apparatus attains equilibrium, and means responsive to the operation of said driving means to reset and lock the driving means against operation.

4. A control device for recording mechanism of weighing apparatus, said device including driving means for the recording mechanism, a trigger for maintaining the driving means against operation, a lever for locking the trigger in operative position, locking means for retaining the said lever in a position to lock the trigger in its operative position, means responsive to the operation of the weighing mechanism for rendering the last said means active when the weighing apparatus attains equilibrium, the means for rendering the lever active to lock said trigger being also operable to render said lever inactive to release said trigger, and means responsive to the operation of said driving means and common to said trigger and said lever for setting them in a position to lock the driving means against operation.

5. A control device for recording mechanism of weighing apparatus, said device including driving means for the recording mechanism, a trigger for maintaining the driving means against operation, a lever for locking the trigger in operative position, locking means for retaining the said lever in a position to lock the trigger in its operative position, means responsive to the operation of the weighing mechanism for rendering the last said means active when the weighing apparatus attains equilibrium, the means for rendering the lever active to lock said trigger being also operable to render said lever inactive to release said trigger, setting means responsive to the operation of said driving means and common to said trigger and said lever for setting them in a position to lock the driving means against operation, means for locking said setting means in active position with respect to said lever and trigger, and a part of said trigger adapted to contact and release said locking means for moving the lever and trigger setting means into inactive position with respect thereto.

6. A control device for the recording mechanism of a weighing apparatus, said device including driving means for the recording mechanism, means for maintaining said driving means against operation until the weighing mechanism attains equilibrium, means embodying fluid actuated means controlled in operation by the actuation of the weighing mechanism, to render the second said means inactive, the said fluid actuated means embodying a pair of fluid displacement elements operating in opposition to each other, and means responsive to the operation of the weighing mechanism for actuating the fluid displacement elements, the last said means also operable to render the second said means active.

7. A control device for the recording mechanism of a weighing apparatus, said device embodying a motor adapted to drive the recording mechanism, trigger mechanism operating to maintain the motor against driving action during weighing movement of the weighing apparatus, and trigger release means including a pair of independently movable sector arms operatively associated with said trigger mechanism and operable in response to movement of the weighing apparatus to release said trigger mechanism when the weighing apparatus attains equilibrium, whereby said motor will be rendered active to drive the recording mechanism.

8. A control device for the recording mechanism of a weighing apparatus, said device embodying a motor adapted to drive the recording mechanism, trigger mechanism operating to maintain the motor against driving action during weighing movement of the weighing apparatus, and trigger release means including a pair of fluid actuated sector arms operatively associated with said trigger mechanism and operable in response to movement of the weighing apparatus to release said trigger mechanism when the weighing apparatus attains equilibrium, whereby said motor will be rendered active to drive the recording mechanism, and means responsive to the operation of the motor for resetting the trigger mechanism.

9. A control device for the recording mechanism of a weighing apparatus, said device embodying a spring motor having a rotary drum to drive the recording mechanism, a rotary spindle extending within the drum and adapted for rotation relatively to the drum, a spiral spring within the drum and having one end fixed to the drum and the other end fixed to the spindle, an abutment on the drum, means adapted to engage said abutment during weighing movement of the weighing apparatus, to maintain the drum against driving movement, and a pair of independently movable sector arms operatively associated with said means and operable in response to movement of the weighing apparatus to remove said means from said abutment and release said drum when the weighing apparatus attains equilibrium, whereby said drum will drive said recording mechanism.

10. A control device for the recording mechanism of a weighing apparatus, said device including a motor for driving the recording mechanism, means for maintaining the motor against operation during the weighing movement of the weighing apparatus, said means embodying a trigger, a lever for controlling the trigger, a pair of independently movable sector arms operatively associated with said lever to render the lever active to maintain the trigger in active position and operable in response to movement of the weighing apparatus to render the lever inactive to release the trigger for driving the recording mechanism when the weighing apparatus attains equilibrium, and means embodying mechanism responsive to the operation of said motor to reset the trigger to lock the motor against operation.

ADRIANUS van DUYN.

References Cited in the file of this patent

UNITED STATES PATENTS

| Number | Name | Date |
|---|---|---|
| 1,011,273 | Thomas | Dec. 12, 1911 |
| 1,182,464 | Emery | May 9, 1916 |
| 1,869,289 | Timson | July 26, 1932 |
| 2,014,154 | Timson | Sept. 20, 1935 |
| 2,027,019 | Bryce | Jan. 7, 1936 |
| 2,299,586 | Malcher | Oct. 20, 1942 |